Dec. 7, 1937.                T. L. HEDGPETH                2,101,709
                           BENCH SAW RIP FENCE
                           Filed March 31, 1937
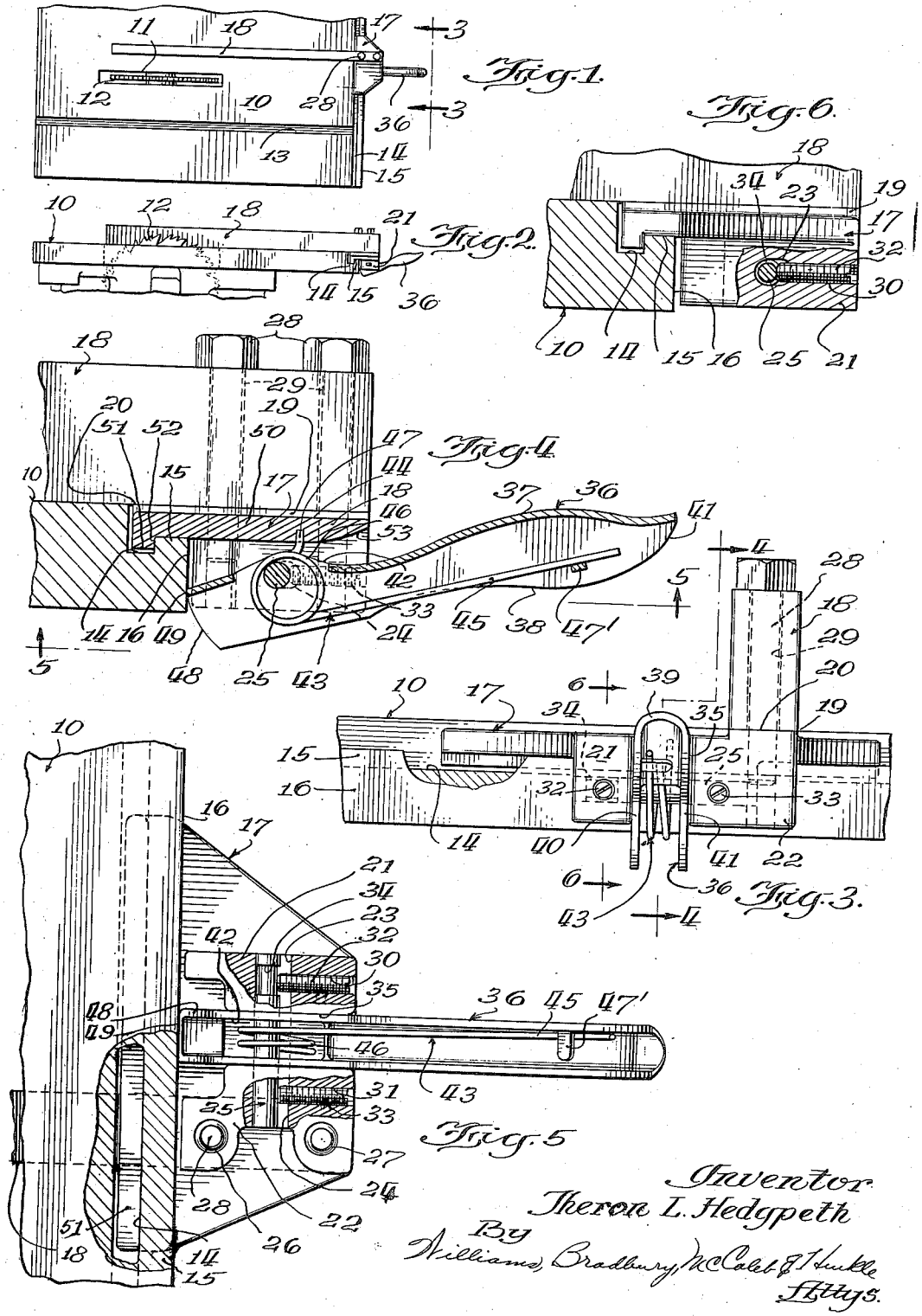
Inventor
Theron L. Hedgpeth
By
Williams, Bradbury, McCaleb & Hinkle
Attys.

Patented Dec. 7, 1937

2,101,709

UNITED STATES PATENT OFFICE 2,101,709

BENCH SAW RIP FENCE

Theron L. Hedgpeth, Oak Park, Ill., assignor to Duro Metal Products Company, Chicago, Ill., a corporation of Illinois Application March 31, 1937, Serial No. 133,959

4 Claims. (Cl. 143—174)

The present invention relates to improvements in bench saw rip fences, and is particularly concerned with an improved arrangement for securing the bench saw rip fence in its proper adjusted position and for permitting the removal of the fence with facility.

One of the objects of the invention is the provision of an improved bench saw rip fence which can be removed by means of a single motion of the hand, the same motion releasing the rip saw fence and lifting it from the saw table.

Another object of the invention is the provision of an improved rip saw fence which may be very easily secured in place by a single motion, the deposit of the fence upon its proper guide and release of the supporting handle serving immediately to secure it where desired.

Another object of the invention is the provision of an improved securing means for such a rip saw fence which is adapted to secure the fence very quickly in a position which is accurately parallel to the plane of the saw blade and in which there is no possibility of the securing mechanism being wedged so tightly that there will be any difficulty of its release.

Another object is the provision of an adjustable securing mechanism by means of which any wear may be taken up and the securing mechanism made to operate in a predetermined manner.

Another object of the invention is the provision of an improved rip saw fence which may be manufactured very economically by reason of the fact that it has a minimum number of parts so that the device may be constructed at a lower cost and placed within the means of a larger number of purchasers than the devices of the prior art.

Referring to the single sheet of drawings accompanying this specification,

Fig. 1 is a fragmentary top plan view of a bench saw equipped with a rip saw fence constructed according to the present invention;

Fig. 2 is a fragmentary side elevational view of a rip saw fence constructed according to the present invention;

Fig. 3 is a full sized fragmentary front elevational view;

Fig. 4 is a vertical sectional view taken on the plane of the line 4—4 of Fig. 3, looking in the direction of the arrows showing the details of structure of the securing device;

Fig. 5 is fragmentary bottom plan view of the rip saw fence, partially broken away to show the structure of the invention;

Fig. 6 is a sectional view taken on the plane of the line 6—6 of Fig. 3.

Referring to Fig. 1, 10 indicates in its entirety the bench saw table, which is provided with the customary slot 11, through which projects the circular saw blade 12. The table top is provided with the usual slots 13, providing guides for various other attachments used on the table top, and it is preferably formed at its forward edge with a guide slot 14 and a guide rib 15.

The guide rib in this case comprises an integral upwardly extending flange of rectangular cross-section, and the slot 14 is also rectangular in section, as shown in Fig. 4, and extends below the upper surface of the guide rib 15. The edge or face 16 of the saw table is preferably plane and smooth so as to permit securing of the rip saw fence in any adjusted position. The rip saw fence preferably comprises a guide head 17 adapted to be slidably mounted on the guide rib 15 and supporting a fence member 18, which extends substantially parallel to the saw blade 12.

The fence member 18 may comprise a bar of metal of rectangular shape in section, and preferably of sufficient thickness so that it will span the slots 13 in the table top without dropping into the slots. Thus the fence is adapted to slide over the slots 13 without any difficulty.

The head 17 comprises a cast metal member which is provided with a substantially flat upper flange body 18, having a raised rib portion 19, with a ground plane surface 20 for supporting the fence 18, which has its sides ground to a perfectly plane surface.

The upper flange 18 of the body 17 supports a pair of depending bearing lugs 21, 22, which are provided with aligned oval bores 23, 24 for receiving a steel pin 25. The lower bearing lug 22 in Fig. 5 has sufficient body so that it may be provided with two vertically extending threaded bores 26, 27 for receiving the threaded ends of the screw bolts 28, which pass through bores in the bar or fence 18 to secure the fence to the head 17.

The apertures 29 in the bar 18 may be slightly enlarged over the shanks of the screw bolts 28 so as to permit a slight adjustment in the angular position of the bar with respect to the head 17. Thus the bar may be placed accurately at right angles to the edge surface 16 of the table top; that is, parallel to the saw blade 12, and then clamped in position with the screw bolts.

The bearing lugs 21, 22 are also each provided with the horizontally extending threaded bores 30, 31, which communicate with the oval bores 24 and are adapted to receive the adjustment screws 32, 33 which are provided with the usual slots for receiving the screw driver. These adjustment screws 32, 33 are adapted to be driven into the oval bores 23, 24 to engage the side of the pin 25 and determine its position in the oval bores 23, 24.

The pin 25 may comprise a hardened steel member substantially cylindrical in shape and of sufficient length to extend into both of the bores 23, 24. At one end this pin 25 may be provided with a peripherally extending slot 34 of sufficient width so that the screw 32 may project into the slot to retain the pin against axial movement out of the bores 23, 24.

The head 17 has a slot 35 between the bearing lugs 21, 22, the slot extending up to the flange body 18 and providing a space for the pivotal mounting of a handle 36. The handle 36 may comprise a sheet metal member which is formed by pressing or stamping operations and is substantially U shaped in cross-section, as seen from the end in Fig. 3. This handle may have its upper palm-engaging surface 37 suitably curved to permit pressure to be applied, and it may have the lower edges 38 of each of its side walls suitably curved at the lower side with a convenient grip by the hand.

The yoke 39 between the side walls 40, 41 is cut away at 42 adjacent the pivot pin 25 so as to provide space for a spring 43 and to permit the end of the spring to project outward into engagement in a bore 44 in the body 17.

The spring 43 has a long, substantially straight arm 45 and a substantially cylindrical helically coiled portion 46, with the outwardly projecting end 47. The coiled portion surrounds the pin 25, which it engages, and the pin is drawn backwards against the ends of the screws 33 by the spring. The end 46 engages in the bore 44 in body 17 and prevents rotation of the spring body. The arm 45 of the spring extends longitudinally of the handle between the side flanges 40 and 41 and is engaged above an inwardly pressed ear 47′, which is punched out of one of the walls 41.

The arm 45 is under initial tension so that it tends to rotate the handle 36 in a clockwise direction in Fig. 4. The other end of the handle adjacent the edge 16 of the table top is preferably relieved at 48, that is, cut away so that only the upper, relatively sharp corner 49 of the yoke engages the face 16.

It should be noted that this is not a cam formation, and I desire to avoid using a cam, as in the devices of the prior art, for the reason that such cams tend to become wedged into position so tightly that they are not capable of quick release, and difficulty is experienced in releasing the fence as desired.

The present engaging point 49 does not have this characteristic, and while it secures the fence tightly in any predetermined position, it may be very quickly released by merely lifting upward on the handle 36. The securement is accomplished by means of the horizontally extending flange portion 50 of the body 17, which extends over the rib 15, and by the depending flange portion 51, which is substantially complementary to the groove 14, and which engages inside of the rib 15. These parts are substantially complementary to each other, and they are drawn into frictional engagement with each other by the handle 36.

The handle 36 acts like a toggle, the points of the toggle being the engagement between the surfaces at 52, the surfaces at 49, and the pivot pin 25. By means of this toggle arrangement a fairly large force is brought into action upon the head 17 to secure it in place by means of the relatively light spring 43.

Due to the small area of engagement between the point 49 of the handle and the face 16, the fence may be released by merely lifting up on the handle 36, which rotates the handle counterclockwise and draws the point 49 out of engagement with the face 16. A continuation of this motion will bring the yoke of the handle into engagement with the stop surface 53, and the handle may then be used to lift the fence off the table.

The fence may be replaced by means of a reverse motion, the mere deposit of it on its proper guide and the release of the handle securing it where it is placed. If desired, the handle 36 may be lifted slightly, and the fence slid upon its guides, from left to right, or vice versa.

The adjustment screws 32 permit the adjustment of the pivot point so that the toggle action is secured, and any wear on the point 49 may be taken up at any time.

It will thus be observed that I have invented an improved rip saw fence, which may be secured in place on the table top by means of a single motion, and which may also be removed from the table top by a single motion. The facility with which this rip saw fence may be removed by a single motion and a single hand is a marked distinction between it and the devices of the prior art which require the use of two hands and several operations to release it.

The present rip saw fence may be constructed very economically, as it has a minimum number of parts, and it does not tend to stick in place because it does not employ an elongated cam surface and cannot wedge so tightly in place that it might cause difficulty with its release. The action of the rip saw fence is automatic in that it is secured in place by release of the handle and it is also released when the operator merely takes hold of the handle to lift the fence.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a rip fence for saw tables, the combination of a table having a guide groove, an upwardly extending guide flange, with a rip fence having a downwardly extending flange adapted to be slidably mounted in said groove, said rip fence being slidably mounted on said first-mentioned flange, said rip fence having a handle pivotally mounted thereon, said handle having a pointed end engaging the edge of said table, and spring means for rotating said handle in such manner as to bring said pointed end into engagement with the edge of said table, said pointed end being of such length as to effect a toggle action between said handle at the pivot thereof and the pivot provided by the point of said end.

2. In a rip fence for saw tables, the combination of a table having a guide groove, an upwardly extending guide flange, with a rip fence having a downwardly extending flange adapted to be slidably mounted in said groove, said rip fence being slidably mounted on said first-mentioned flange, said rip fence having a handle pivotally mounted thereon, said handle having a pointed end engaging the edge of said table, and spring means for rotating said handle in such manner as to bring said pointed end into engagement with the edge of said table, said pointed end being of such length as to effect a toggle action between said handle at the pivot thereof and the pivot provided by the point of said end, said handle being pivotally mounted upon an adjustable pivot pin, whereby the handle may be so adjusted as to provide toggle action between the handle and the edge of the table, irrespective of wear.

3. In a rip fence for bench saws or the like, the combination of a table provided with a guide, a rip fence adapted to be mounted on said table and provided with a guide head, said guide head having means for slidably engaging the guide, and a handle pivotally mounted on said head, said handle having a pointed end engaging the edge of said table, and being so pivoted that the point of the handle, the pivot of the handle, and the edge of the table are just out of alignment, to effect a toggle action between the handle and the edge of the table, and spring means carried by said handle for urging said pointed end into constant engagement with the edge of said table.

4. In a rip fence for bench saws or the like, the combination of a table provided with a guide, a rip fence adapted to be mounted on said table and provided with a guide head, said guide head having means for slidably engaging the guide, and a handle pivotally mounted on said head, said handle having a pointed end engaging the edge of said table, and being so pivoted that the point of the handle, the pivot of the handle, and the edge of the table are just out of alignment, to effect a toggle action between the handle and the edge of the table, and spring means carried by said handle for urging said pointed end into constant engagement with the edge of said table, said handle comprising a sheet metal member of substantially U-shape, pivotally mounted on a pin carried by said head, and said spring being mounted about said pin to hold said pin in place in enlarged bearing apertures.

THERON L. HEDGPETH.